(12) United States Patent
Okamoto et al.

(10) Patent No.: US 6,489,437 B2
(45) Date of Patent: Dec. 3, 2002

(54) POLYARYLENE SULFIDE RESIN COMPOSITION

(75) Inventors: Masaya Okamoto, Ichihara (JP); Toru Bando, Ichihara (JP)

(73) Assignees: Idemitsu Kosan Co., Ltd., Tokyo (JP); Idemitsu Petrochemical Co., Ltd., Tokyo (JP); Petroleum Energy Center (PEC), Tokyo (JP)

( * ) Notice: Subject to any disclaimer, the term of this patent is extended or adjusted under 35 U.S.C. 154(b) by 0 days.

(21) Appl. No.: 09/349,234

(22) Filed: Jul. 8, 1999

(65) Prior Publication Data

US 2002/0062003 A1 May 23, 2002

(30) Foreign Application Priority Data

Jul. 9, 1998 (JP) ............................................ 10-194370
Mar. 24, 1999 (JP) ............................................ 11-079132

(51) Int. Cl.[7] .............................................. C08G 75/14
(52) U.S. Cl. ........................ 528/388; 528/389; 524/609
(58) Field of Search ................................ 528/388, 389; 524/609

(56) References Cited

U.S. PATENT DOCUMENTS 4,868,275 A * 9/1989 Kato et al. .................. 528/212
5,733,962 A    3/1998 Osako et al.

* cited by examiner

*Primary Examiner*—Duc Truong
(74) *Attorney, Agent, or Firm*—Oblon, Spivak, McClelland, Maier & Neustadt, P.C.

(57) ABSTRACT

Provided is a polyarylene sulfide resin composition having well-balanced fluidity and mechanical strength. The composition is such that its spiral flow length, x (mm), to give a molding having a thickness of 1 mm and the flexural strength, y (MPa), of the molding satisfy the following numerical formula (I), and comprises (A) from 50 to 70 parts by weight of a polyarylene sulfide resin, (B) from 30 to 50 parts by weight of glass fibers and (C) from 0 to 3 parts by weight, relative to 100 parts by weight of the polyarylene sulfide resin (A), of a coupling agent.

$$y \geq -(3x/10)+340 \qquad (I)$$

wherein x falls between 100 and 300.

10 Claims, 1 Drawing Sheet

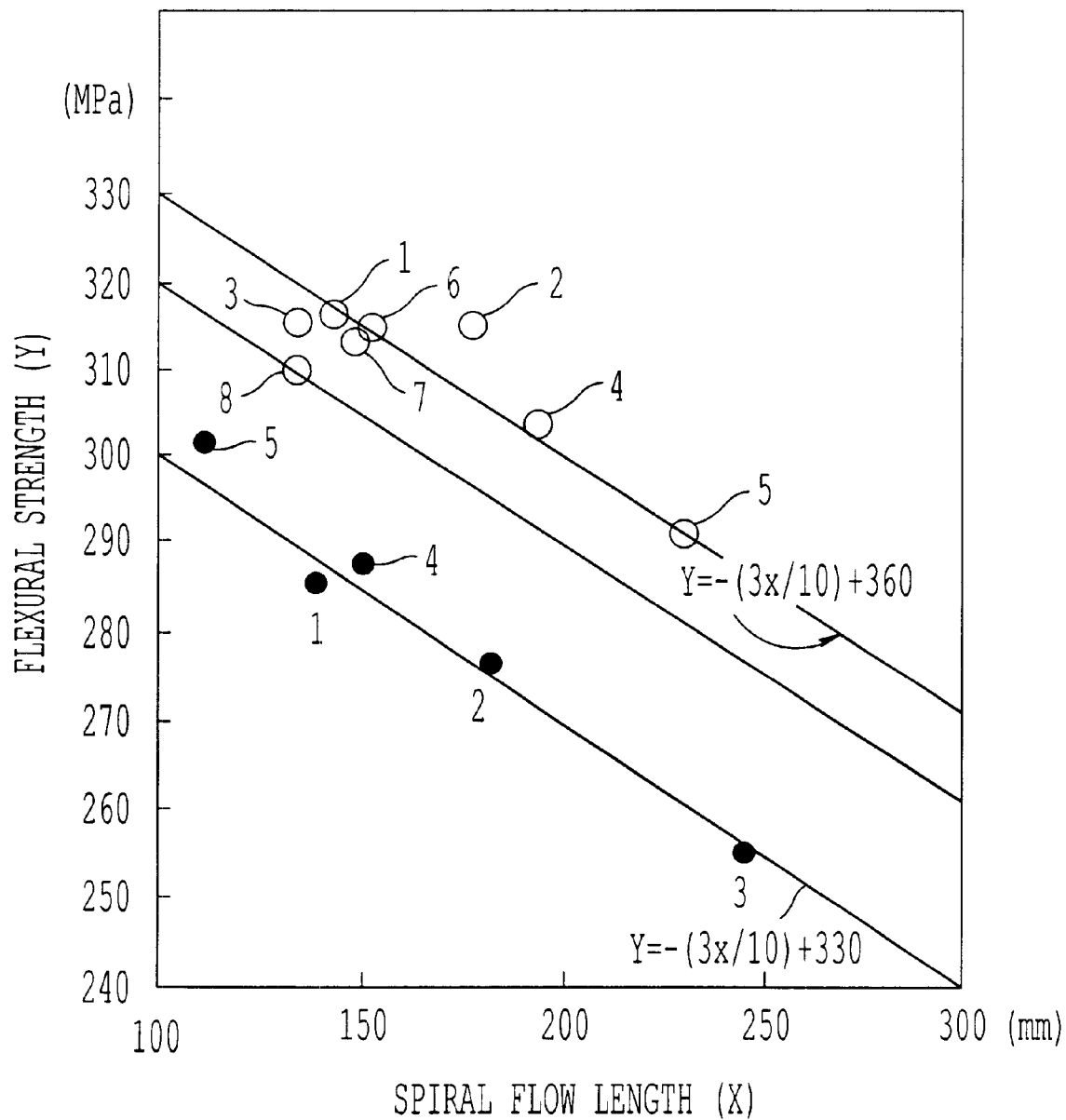

POLYARYLENE SULFIDE RESIN COMPOSITION

BACKGROUND OF THE INVENTION

1. Field of the Invention

The present invention relates to a polyarylene sulfide resin composition. Precisely, it relates to a well-balanced polyarylene sulfide resin composition having good fluidity and capable of being molded into moldings with good flexural strength.

2. Description of the Related Art

Polyarylene sulfide resins are referred to as super-engineering plastics, and have many applications, for example, to car parts, electrical and electronic parts and others, as having the advantages of heat resistance, flame retardancy, rigidity, solvent resistance and electrical insulation.

However, for car engine parts and others that are exposed to severe surroundings, resin compositions comprising conventional polyphenylene sulfide resins as compounded and reinforced with glass fibers are unsatisfactory, as their mechanical strength is not on the practicable level.

For improving the resin compositions, various methods have heretofore been proposed. For example, one comprises adding a coupling agent thereto (see JP-A 63-251430, 3-12453, 9-31632); another comprises blending polymers such as polysulfones and others (see JP-A 63-130662). However, these are still unsatisfactory.

SUMMARY OF THE INVENTION

The object of the invention is to provide a well-balanced polyarylene sulfide resin composition having both good fluidity and good mechanical strength.

We, the present inventors have assiduously studied the problems noted above, and have completed the present invention which is as follows:

[1] A polyarylene sulfide resin composition of which the spiral flow length, x (mm), to give a molding having a thickness of 1 mm and the flexural strength, y (MPa), of the molding satisfy the following numerical formula (I):

$$y \geq -(3x/10)+340 \quad (I)$$

wherein x falls between 100 and 300.

[2] The polyarylene sulfide resin composition of [1], which comprises (A) from 50 to 70 parts by weight of a polyarylene sulfide resin, (B) from 30 to 50 parts by weight of glass fibers, and (C) from 0 to 3 parts by weight, relative to 100 parts by weight of the polyarylene sulfide resin (A), of a coupling agent.

[3] A polyarylene sulfide resin composition, which comprises (A) from 50 to 70 parts by weight of a polyarylene sulfide resin as prepared by copolymerizing an essential monomer of the following formula (III) with a comonomer of the following formula (II) in a ratio of the comonomer to the total of the comonomer and the essential monomer of falling between 0.5 and 15 mol %, (B) from 30 to 50 parts by weight of glass fibers, and (C) from 0 to 3 parts by weight, relative to 100 parts by weight of the polyarylene sulfide resin (A), of a coupling agent.

(II)

wherein $X^1$ represents a halogen atom, and plural $X^1$'s may be the same or different; A represents an OH group; and j falls between 1 and 4,

(III)

wherein $X^2$ represents a halogen atom, and plural $X^2$'s may be the same or different; $R^1$ represents an alkyl group having from 1 to 6 carbon atoms, or an aryl or arylalkyl group having from 6 to 20 carbon atoms, and plural $R^1$'s may be the same or different; and h falls between 0 and 4.

[4] The polyarylene sulfide resin composition of [3], which satisfies the condition of the numerical formula (I) as in [1].

[5] The polyarylene sulfide resin composition of [3] or [4], wherein the polyarylene sulfide resin is a copolymer of p-dichlorobenzene and 2,4-dichlorophenol.

[6] A polyarylene sulfide resin composition, which comprises (A) from 50 to 70 parts by weight of a polyarylene sulfide resin as prepared by copolymerizing an essential monomer of the following formula (III) with a comonomer of the following formula (IV) in a ratio of the comonomer to the total of the comonomer and the essential monomer of falling between 0.5 and 15 mol %, (B) from 30 to 50 parts by weight of glass fibers, and (C) from 0 to 3 parts by weight, relative to 100 parts by weight of the polyarylene sulfide resin (A), of a coupling agent.

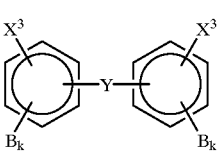

(IV)

wherein $X^3$ represents a halogen atom, and plural $X^3$'s may be the same or different; B represents an OH group or an $NH_2$ group, and plural B's may be the same or different; k falls between 1 and 4; Y represents a single bond, $CH_2$, $SO_2$, NH, O, CO, oranalkylidene, alkylene orpolymethylene group having from 2 to 20 carbon atoms,

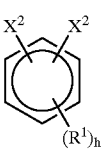

(III)

wherein $X^2$ represents a halogen atom, and plural $X^2$'s may be the same or different; R represents an alkyl group having from 1 to 6 carbon atoms, or an aryl or arylalkyl group having from 6 to 20 carbon atoms, and plural $R^1$'s may be the same or different; and h falls between 0 and 4.

[7] The polyarylene sulfide resin composition of [6], which satisfies the condition of the numerical formula (I) as in [1].

[8] The polyarylene sulfide resin composition of [6] or [7], wherein the polyarylene sulfide resin is a copolymer of p-dichlorobenzene and 3,3'-dichloro-4,4'-diaminobiphenyl.

[9] A polyarylene sulfide resin composition, which comprises (A) from 50 to 70 parts by weight of a polyarylene sulfide resin as prepared by polymerizing an essential monomer of the following formula (III) in the presence of a terminating agent of the following formula (V) in a ratio of the terminating agent to the total of the terminating agent and the essential monomer of falling between 0.5 and 5 mol %, (B) from 30 to 50 parts by weight of glass fibers, and (C) from 0 to 3 parts by weight, relative to 100 parts by weight of the polyarylene sulfide resin (A), of a coupling agent.

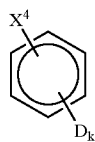

(V)

wherein $X^4$ represents a halogen atom; D represents an OH group; and k falls between 1 and 5,

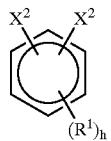

(III)

wherein X represents a halogen atom, and plural $X^2$'s may be the same or different; $R^1$ represents an alkyl group having from 1 to 6 carbon atoms, or an aryl or arylalkyl group having from 6 to 20 carbon atoms, and plural $R^1$'s may be the same or different; and h falls between 0 and 4.

[10] The polyarylene sulfide resin composition of [9], which satisfies the condition of the numerical formula (I) as in [1].

[11] The polyarylene sulfide resin composition of [9] or [10], wherein the polyarylene sulfide resin is a polymer of p-dichlorobenzene with p-bromophenol and/or p-chlorophenol.

BRIEF DESCRIPTION OF THE DRAWING

FIG. 1 is a graph showing the data of spiral flow length, x (mm), versus flexural strength, y (MPa), of the samples of Examples (○) of the invention and those of Comparative Examples (●).

DETAILED DESCRIPTION OF THE INVENTION

The invention is described in detail hereinunder. Physical Balance between Fluidity and Mechanical Strength:

The polyarylene sulfide resin composition of one aspect of the invention has well-balanced physical properties, and is characterized in that its spiral flow length, x (mm), to give a molding having a thickness of 1 mm, which is an index of the fluidity of the composition, and the flexural strength, y (MPa) of the molding, which is an index of the mechanical strength of the composition, satisfy the following numerical formula (I):

$$y \geq -(3x/10)+340 \qquad (I)$$

wherein x falls between 100 and 300, but preferably, $y \geq -(3x/10)+350$ (wherein x falls between 100 and 300, more preferably, $y \geq -(3x/10)+360$ (wherein x falls between 100 and 300. The uppermost limit of y is not specifically defined, but preferably, $y \leq -(3x/10)+390$. If the spiral flow length, x (mm), is smaller than 100 mm, the fluidity of the composition is poor; but if it is larger than 300 mm, the flexural strength of the moldings of the composition is low.

In general, increasing a resin through molecular weight control lowers the mechanical strength of the resin. As opposed to this, the resin composition of the invention is characterized in that its mechanical strength is high, depending on its fluidity. No polyarylene sulfide resin composition has heretofore been known capable of satisfying the condition of the formula (I).

Polyarylene Sulfide Resin Composition:

The polyarylene sulfide resin composition of the invention comprises a polyarylene sulfide resin as compounded with various fibrous fillers.

One preferred embodiment of the polyarylene sulfide resin composition comprises (A) from 50 to 70 parts by weight of a polyarylene sulfide resin and (B) from 30 to 50 parts by weight of glass fibers, with (A) and (B) totaling up to 100 parts by weight, and (C) from 0 to 3 parts by weight, relative to 100 parts by weight of the polyarylene sulfide resin (A), of a coupling agent. More preferably, the resin composition comprises (A) from 55 to 65 parts by weight of a polyarylene sulfide resin, (B) from 45 to 35 parts by weight of glass fibers, and (C) from 0 to 2.5 parts by weight, relative to 100 parts by weight of the polyarylene sulfide resin (A), of a coupling agent. If the amount of glass fibers to be in the composition is larger than 50 parts by weight, the fluidity of the composition will be poor; but if it is smaller than 30 parts by weight, the dimension stability of the moldings of the composition will be poor. Regarding the coupling agent, if the glass fibers to be in the composition are pre-treated with it, it may be added to the composition depending on the degree of the pre-coupling treatment with it of the glass fibers. When the degree of pre-coupling treatment of the glass fibers is satisfactory, adding any additional coupling agent to the composition is unnecessary. If not, from 0.1 to 3.0 parts, relative to 100 parts by weight of the polyarylene sulfide resin (A), of a coupling agent may be added to the composition.

If, however, the amount of the coupling agent added is larger than 3.0 parts by weight, the effect of the filler to increase the volume of the composition could not be expected. On the other hand, if the amount is smaller than 0.1 parts by weight, the mechanical strength of the composition will lower.

Polyarylene Sulfide Resin:

The polyarylene sulfide resin to be used in the invention is a polymer having repetitive units of a structural formula, —Ar—S where Ar represents an arylene group and S represents sulfur, in an amount of at least 70 mol %, and its typical examples are polyarylene sulfides having repetitive units of a chemical formula (VI):

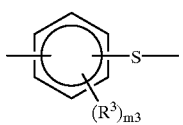 (VI)

wherein $R^3$ represents a substituent selected from an alkyl or alkoxy group having at most 6 carbon atoms, a phenyl group, a carboxyl group or its metal salt, a nitro group, and a halogen atom such as fluorine, chlorine, bromine, etc.; and m3 represents an integer falling between 0 and 4, in an amount of at least 70 mol %.

If the amount of the repetitive units in them is smaller than 70 mol %, the polymers will be poor in the crystal component intrinsic to semi crystalline polymers, and their mechanical strength will be low.

Not only homopolymers but also copolymers are usable as the polyarylene sulfide resin.

Comonomer units constituting the copolymers include metaphenylene sulfide units, orthophenylene sulfide units, p,p'-diphenylene ketone sulfide units, p,p'-diphenylene sulfone sulfide units, p,p'-biphenylene sulfide units, p,p'-diphenylenemethylene sulfide units, p,p'-diphenylenecumenyl sulfide units, naphthyl sulfide units, etc.

Especially preferred are polyarylene sulfide resins to be prepared by polycondensing an essential monomer to constitute the main polymer chain of the following formula (III) with a comonomer of the following formulae (II) and/or (IV), as having well-balanced fluidity and mechanical strength.

 (II)

wherein $X^1$ represents a halogen atom, and plural $X^1$'s may be the same or different; A represents an OH group; and j falls between 1 and 4.

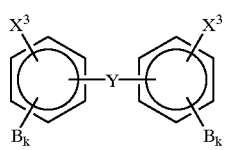 (IV)

wherein $X^3$ represents a halogen atom, and plural $X^3$'s may be the same or different; B represents an OH group or an $NH_2$ group, and plural B's may be the same or different; k falls between 1 and 4; Y represents a single bond, $CH_2$, $SO_2$, NH, O, CO, or an alkylidene, alkylene or polymethylene group having from 2 to 20 carbon atoms.

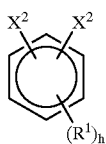 (III)

wherein $X^2$ represents a halogen atom, and plural $X^2$'s may be the same or different; $R^1$ represents an alkyl group having from 1 to 6 carbon atoms, or an aryl or arylalkyl group having from 6 to 20 carbon atoms, and plural R1's may be the same or different; and h falls between 0 and 4.

Polymers as prepared in the presence of a terminating agent are also employable herein.

The terminating agent for use in the invention is not specifically defined. Preferred are polyarylene sulfide resins to be prepared by polycondensing an essential monomer of formula (III) in the presence of a terminating agent of the following formula (V), as having good fluidity and good mechanical strength.

 (V)

wherein $X^4$ represents a halogen atom; D represents an OH group; and k falls between 1 and 5, The polyarylene sulfide resin for use in the invention includes polymers having a substantially linear structure, and those having a branched or crosslinked structure. For the latter, a small part of monomers to be copolymerized have at least three function groups in one molecule. The latter may be blended with the former having a substantially linear structure.

The polyarylene sulfide resin for use in the invention may be produced in any known manner. For example, a dihalo-aromatic compound may be polycondensed with a sulfur source in an organic polar solvent, then washed and dried to give the resin.

The dihalo-aromatic compound of formula (III) includes, for example, p-dichlorobenzene, p-dibromobenzene, 2,5-dichloro-tert-butylbenzene, 2, 5-dibromo-tert-butylbenzene, 2,5-dichlorobiphenyl, etc. Of those, preferred are p-dichlorobenzene and p-dibromobenzene.

The dihalo-aromatic compound of formula (II) includes, for example, 2,3-dichlorophenol, 2,3-dibromophenol, 2,4-dichlorophenol, 2,4-dibromophenol, 2,5-dichlorophenol, 2,5-dibromophenol, etc. Of those, preferred are 2,4-dichlorophenol and 2,5-dichlorophenol.

The dihalo-aromatic compound of formula (IV) includes, for example, 3,3'-dichloro-4,4'-diaminobiphenyl, 3,3'-dibromo-4,4'-diaminobiphenyl, 3,3'-dichloro-4,4'-dihydroxybiphenyl, 3,3'-dibromo-4,4'-dihydroxybiphenyl, di(3-chloro-4-amino)phenylmethane, etc. Of those, preferred is 3, 3'-dichloro-4,4'-diaminobiphenyl. The resin comprising units derived from 3,3'-dichloro-4,4'-diaminobiphenyl are preferred, as having an extremely high Izod impact strength (measured at room temperature with no notch).

These comonomers maybe used either singly or as combined. Regarding the amount of the comonomer to be copolymerized, it is desirable that the ratio of the comonomer to the total of the comonomer and the essential monomer falls between 0.5 and 15 mol % or so. If the ratio is smaller than 0.5 mol %, the improvement in the balance between the fluidity and the mechanical strength of the resin composition will be low; but if it is larger than 15 mol %, the heat resistance of the resin composition will be poor.

If desired, the polymers for the resin may be further copolymerized with any other comonomers (e.g., m-dichlorobenzene, etc.) not interfering with the effect of the resin composition.

The halogenophenol of formula (V) serving as a terminating agent includes, for example, p-bromophenol, m-bromophenol, o-bromophenol, p-chlorophenol, m-chlorophenol, o-chlorophenol, p-fluorophenol, m-fluorophenol, o-fluorophenol, p-iodophenol, m-iodophenol, o-iodophenol, etc. Of those, preferred are p-bromophenol and p-chlorophenol.

One or more of those terminating agents are employable herein either singly or as combined. Regarding the amount of the terminating agent to be in the polymerization system, it is desirable that the ratio of the terminating agent to the total of the terminating agent and the essential monomer of a dihalo-aromatic compound falls between 0.5 and 5 mol %, more preferably between 0.7 and 3 mol %, even more preferably between 1 and 2 mol %. If the ratio is smaller than 0.5 mol %, the improvement in the mechanical strength of the resin composition will be low; but if it is larger than 5 mol %, the molecular weight of the polymers for the resin could not increase to a satisfactory degree.

The sulfur source is not specifically defined. Preferably employed are alkali metal sulfides, including, for example, lithium sulfide, sodium sulfide, potassium sulfide, rubidium sulfide, etc. Preferred are lithium sulfide and sodium sulfide. To prepare lithium sulfide, for example, hydrogen sulfide may be reacted with lithium hydroxide, as so proposed in JP-A 7-330312.

The inherent viscosity, $\eta_{inh}$ (dl/g), of polyarylene sulfides for use in the invention indicates the molecular weight thereof. The method for measuring the inherent viscosity will be mentioned hereinunder. Preferably, $\eta_{inh}$ (dl/g) of polyarylene sulfides for use in the invention falls between 0.14 and 0.28. Of polyarylene sulfides, the inherent viscosity $\eta_{inh}$ (dl/g) and the spiral flow length (mm) is nearly linearly correlated with each other. (In other words, the correlation between the two give a substantially linear expression.

Glass Fibers:

Glass fibers for use in the invention are not specifically defined. For these, employable is any of alkali glass, low-alkali glass and non-alkali glass. The fiber length preferably falls between 0.1 and 8 mm, more preferably between 0.3 and 6 mm; and the fiber diameter preferably falls between 0.1 and 30 μm, more preferably between 0.5 and 25 μm. If the fiber length is smaller than 0.1 mm, the reinforcing effect of the fibers will be poor; but if it is larger than 8 mm, the fluidity of the resin composition will be lowered. If the fiber diameter is smaller than 0.1 μm, the fluidity of the resin composition will be lowered; but if it is larger than 30 atm, the strength of the resin composition will be lowered. The morphology of the fibers for use in the invention is not also specifically defined. For example, employable are any of rovings, milled fibers, chopped strands, etc. One or more of different types of glass fibers may be used either singly or as combined.

In order to enhance their affinity for resins, the glass fibers may be treated on their surface with a silane coupling agent such as aminosilanes, epoxysilanes, vinylsilanes, methacrylsilanes, etc.; or with a titanate coupling agent such as tetramethyl orthotitanate, tetraethyl orthotitanate, etc.; or even with chromium complex compounds or boron compounds.

As so mentioned hereinabove, however, any of those coupling agents may be separately added to the resin composition in place of treating the glass fibers on their surface with them.

If desired, any inorganic filler such as those to be mentioned below may be added to the resin composition, apart from the glass fibers, so far as the filler added does not interfere with the effect of the invention. The optional filler includes, for example, carbon fibers, aramide fibers, potassium titanate whiskers, silicon carbide whiskers, mica ceramic fibers, wollastonite, mica, talc, silica, alumina, kaolin, clay, silica alumina, carbon black, calciumcarbonate, titanium oxide, lithium carbonate, molybdenum disulfide, graphite, ironoxide, glassbeads, calciumphosphate, calcium sulfate, magnesium carbonate, magnesium phosphate, silicon nitride, hydrotalcite, etc. Formulation:

Apolyarylene sulfide resin, glass fibers and a coupling agent are formulated in a predetermined ratio as above, and mixed in a ribbon tumbler, a Henschel mixer, a Banbury mixer, a drum tumbler, a single-screw extruder or the like to give the resin composition of the invention. As a rule, the temperature at which they are mixed suitably falls between 280 and 320° C.

The invention is described in more detail with reference to the following Examples, which, however, are not intended to restrict the scope of the invention.

The test methods employed in the Examples are as follows: Spiral Flow Length:

To determine the spiral flow length of a resin composition, used is Toshiba Machine Co.'s IS30EPN (this is a 30-ton molding machine) equipped with a spiral flow mold for 1 mm-thick sheets.

Concretely, a melt of a resin composition is injected into the mold under an injection pressure of 1000 kgf/cm$^2$ (set pressure 49%), at a resin temperature of 320° C. and at a mold temperature of 135° C., and is molded therein, for which the injection time is for 10 seconds. The length of the resin flow having been injected in that condition is measured, and this indicates the spiral flow length of the resin composition tested.

Flexural Strength:

To determine the flexural strength of a molding of a resin composition, used is Japan Steel Work's J750EP (this is a 50-ton molding machine). Concretely, test pieces having a size of 127×12.7×3.18 mm are molded from a resin composition in the machine, at a resin temperature of 320° C. and at a mold temperature of 135° C. The test pieces are measured according to ASTM-790.

Inherent Viscosity:

A sample of a polymer weighing 0.04 g±0.001 g is dissolved in 10 cc of α-chloronaphthalene at 235° C. over a period of 15 minutes, and the viscosity of the resulting polymer solution is measured in a thermostat at 206° C. On the other hand, the viscosity of α-chloronaphthalene not containing the polymer is measured in the same manner. The relative viscosity of the polymer to the viscosity of α-chloronaphthalene not containing the polymer is obtained. The inherent viscosity $\eta_{inh}$ of the polymer is represented by the following equation:

$$\eta^{inh} = \ln(\text{relative viscosity})/\text{polymer concentration [dl/g]}$$

EXAMPLE 1:

10 mols (459.4 g) of lithium sulfide, 9 mols (1323 g) of p-dichlorobenzene, 0.5 mol (20.98 g) of lithium hydroxide monohydrate and 4.2 liters of NMP (N-methyl-2-pyrrolidone) were put into a 10-liter autoclave, reacted therein at 200° C. for 5 hours, and cooled to room temperature to prepare a prepolymer.

To the prepolymer, added were 0.1 mols (16.3 g) of 2,4-dichlorophenol, 0.9 mols (132.3 g) of p-dichlorobenzene and 8.0 mols (144.1 g) of water, and reacted therewith at 260° C. for 3 hours. The molar fraction of 2,4-dichlorophenol fed into the reaction system was 1 mol %. After the resulting reaction mixture was cooled to 100° C., the resulting liquid phase was separated from it, and the polymer precipitated was collected. The polymer was then washed three times with cold water.

The polymer was put into a 10-liter autoclave, to which were added 5 liters of NMP and 30 cc of acetic acid. The polymer was washed with these at 150° C. for 1 hour. After cooled, the solid polymer was washed with cold water until the electric conductivity of the wash water reached 20 $\mu$S/cm or lower. After thus washed, the polymer was dried in an air drier at 120° C. for 24 hours, and then under vacuum at 120° C. for 24 hours.

60 parts by weight of the polymer prepared herein, 40 parts by weight of glass fibers (JAF591 from Asahi Fiber Glass), and 0.6 parts by weight of a silane coupling agent (SH6040 from Toray Dow Corning) were blended in dry, and pelletized through an extruder at 320° C.

The resulting pellets were tested for the spiral flow length and the flexural strength according to the methods noted above. The data are shown in Table 1 and plotted in FIG. 1.

EXAMPLE 2

The same process as in Example 1 was repeated except that 2,5-dichlorophenol was used in place of 2,4-dichlorophenol.

EXAMPLE 3

A prepolymer was prepared in the same manner as in Example 1, to which were added 0.2 mol (65.21 g) of 3,3'-dichloro-4,4'-diaminobiphenyl hydrochloride, 0.8 mol (117.6 g) of p-dichlorobenzene, 0.4 mol (16.79 g) of lithium hydroxide monohydrate and 4.6 mols (82.87 g) of water, and reacted therewith at 260° C. for 3 hours. The molar fraction of 3,3'-dichloro-4,4'-diaminobiphenyl fed into the reaction system was 2 mol %. The resulting reaction mixture was then processed in the same manner as in Example 1.

EXAMPLE 4

The same process as in Example 1 was repeated except that 12.0 mols (216.2 g) but not 8.0 mols of water was added to the prepolymer.

EXAMPLE 5

The same process as in Example 3 was repeated except that 9.6 mols (172.9 g) but not 4.6 mols of water was added to the prepolymer.

EXAMPLE 6

10 mols (459.4 g) of lithium sulfide, 9.9 mols (1455.3 g) of p-dichlorobenzene, 0.1 mol (16.3 g) of 2,4-dichlorophenol, 0.5 mol (20.98 g) of lithium hydroxide monohydrate, 9.0 mols (162.1 g) of water and 4.2 liters of NMP were put into a 10-liter autoclave, and reacted therein at 260° C. for 3 hours. The molar fraction of 2,4-dichlorophenol fed into the reaction system was 1 mol %. The reaction mixture thus formed was cooled to 100° C., the resulting liquid phase was separated from it, and the polymer precipitated was collected. This was then processed in the same manner as in Example 1.

EXAMPLE 7

10 mols (459.4 g) of lithium sulfide, 9.8 mols (1440.6 g) of p-dichlorobenzene, 0.2 mol (65.21 g) of 3,3'-dichloro-4,4'-diaminobiphenyl hydrochloride, 0.9 mol (37.77 g) of lithium hydroxide monohydrate, 5.6 mols (100.9 g) of water and 4.2 liters of NMP were put into a 10-liter autoclave, and reacted therein at 260° C. for 3 hours. The molar fraction of 3,3'-dichloro-4,4'-diaminobiphenyl hydrochloride fed into the reaction system was 2 mol %. The reaction mixture thus formed was cooled to 100° C., the resulting liquid phase was separated from it, and the polymer precipitated was collected. This was then processed in the same manner as in Example 1.

EXAMPLE 8

The same process as in Example 1 was repeated except that 0.1 mol (17.3 g) of p-bromophenol but not 0.1 mol of 2,4-dichlorophenol and 5.0 mols (90 g) but not 8.0 mols of water were added to the prepolymer. The molar fraction of p-bromophenol fed into the reaction system was 1 mol %.

COMPARATIVE EXAMPLE 1

A prepolymer was prepared in the same manner as in Example 1, to which were added 1.0 mol (147.0 g) of p-dichlorobenzene and 5 mols (90.1 g) of water and reacted therewith at 260° C. for 3 hours. The resulting reaction mixture was then processed in the same manner as in Example 1.

COMPARATIVE EXAMPLE 2

The same process as in Comparative Example 1 was repeated except that 10 mol (180 g) but not 5 mols of water was added to the prepolymer.

COMPARATIVE EXAMPLE 3

The same process as in Comparative Example 1 was repeated except that 15 mol (270 g) but not 5 mols of water was added to the prepolymer.

COMPARATIVE EXAMPLE 4

10 mols (459.4 g) of lithium sulfide, 10 mols (1470 g) of p-dichlorobenzene, 0.5 mol (20.98 g) of lithium hydroxide monohydrate, 6 mols (108.1 g) of water and 4.2 liters of NMP were put into a 10-liter autoclave, and reacted therein at 260° C. for 3 hours. The reaction mixture thus formed was cooled to 100° C., the resulting liquid phase was separated from it, and the polymer precipitated was collected. This was then processed in the same manner as in Example 1.

COMPARATIVE EXAMPLE 5

The same process as in Example 1 was repeated except that a commercially-available polymer of PPSLN2 (from Toprene) was used herein.

TABLE 1

| | Spiral Flow Length x (mm) | Flexural Strength y (MPa) | Inherent Viscosity of Polymer (dl/g) |
|---|---|---|---|
| Example 1 | 144 | 315 | 0.24 |
| Example 2 | 179 | 314 | 0.22 |
| Example 3 | 135 | 314 | 0.24 |
| Example 4 | 198 | 305 | 0.21 |
| Example 5 | 230 | 291 | 0.20 |
| Example 6 | 155 | 314 | 0.23 |
| Example 7 | 150 | 312 | 0.23 |
| Example 8 | 135 | 310 | 0.24 |
| Comparative Example 1 | 140 | 285 | 0.24 |
| Comparative Example 2 | 182 | 276 | 0.22 |
| Comparative Example 3 | 248 | 255 | 0.19 |
| Comparative Example 4 | 155 | 287 | 0.23 |
| Comparative Example 5 | 112 | 301 | 0.25 |

As in FIG. 1, the resin compositions of the present invention all satisfy the condition of $y \geq -(3x/10)+340$ where x indicates the spiral flow length (mm) and y indicates the flexural strength (MPa). In particular, the samples of Examples 2, 4, 5 and 6 satisfy the condition of $y \geq -(3x/10)+360$.

The data mean that the resin compositions of the invention all have well-balanced fluidity and mechanical strength.

While the invention has been described in detail and with reference to specific embodiments thereof, it will be apparent to one skilled in the art that various changes and modifications can be made therein without departing from the spirit and scope thereof.

What is claimed is:

1. A polyarylene sulfide resin composition, which comprises (A) from 50 to 70 parts by weight of a polyarylene sulfide resin as prepared by copolymerizing an essential monomer of the following formula (III) with a comonomer of the following formula (IV) in a ratio of the comonomer to the total of the comonomer and the essential monomer of falling between 0.5 and 15 mol %, (B) from 30 to 50 parts by weight of glass fibers, and (C) from 0 to 3 parts by weight, relative to 100 parts by weight of the polyarylene sulfide resin (A), of a coupling agent.

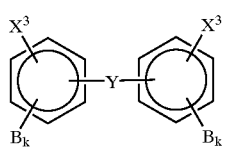
(IV)

wherein $X^3$ represents a halogen atom, and plural $X^3$'s may be the same or different; B represents an OH group or an $NH_2$ group, and plural B's may be the same or different; k falls between 1 and 4; Y represents a single bond, $CH_2$, $SO_2$, NH, O, CO, oranalkylidene, alkylene or polymethylene group having from 2 to 20 carbon atoms,

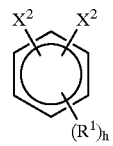
(III)

wherein $X^2$ represents a halogen atom, and plural $X^2$'s may be the same or different; $R^1$ represents an alkyl group having from 1 to 6 carbon atoms, or an aryl or arylalkyl group having from 6 to 20 carbon atoms, and plural R1's may be the same or different; and h falls between 0 and 4.

2. The polyarylene sulfide resin composition as claimed in claim 1, which satisfies the condition of the following numerical formula (I)

which specifies that the spiral flow length, x(mm), to give a molding having a thickness of 1 mm and the flexural strength, y (MPa), of the molding satisfy the following numerical formula (I):

$$y \geq -(3x/10)+340 \quad (I)$$

wherein x falls between 100 and 300.

3. The polyarylene sulfide resin composition as claimed in claim 1 or 2, wherein the polyarylene sulfide resin is a copolymer of p-dichlorobenzene and 3,3'-dichloro-4,4'-diaminobiphenyl.

4. A polyarylene sulfide resin composition, which comprises (A) from 50 to 70 parts by weight of a polyarylene sulfide resin as prepared by polymerizing an essential monomer of the following formula (III) in the presence of a terminating agent of the following formula (V) in a ratio of the terminating agent to the total of the terminating agent and the essential monomer of falling between 0.5 and 5 mol %, (B) from 30 to 50 parts by weight of glass fibers, and (C) from 0 to 3 parts by weight, relative to 100 parts by weight of the polyarylene sulfide resin (A), of a coupling agent.

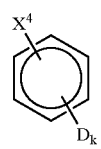
(V)

wherein $X^4$ represents a halogen atom; D represents an OH group; and k falls between 1 and 5,

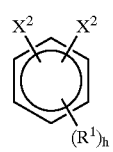
(III)

wherein represents a halogen atom, and plural $X^2$'s may be the same or different; $R^1$ represents an alkyl group having from 1 to 6 carbon atoms, or an aryl or arylalkyl group having from 6 to 20 carbon atoms, and plural $R^1$'s may be the same or different; and h falls between 0 and 4.

5. The polyarylene sulfide resin composition as claimed in claim 4, which satisfies the condition of the following numerical formula (I)

which specifies that the spiral flow length, x(mm), to give a molding having a thickness of 1 mm and the flexural strength, y (MPa), of the molding satisfy the following numerical formula (I):

$$y \geq -(3x/10)+340 \qquad (I)$$

wherein x falls between 100 and 300.

6. The polyarylene sulfide resin composition as claimed in claim 4 or 5, wherein the polyarylene sulfide resin is a polymer of p-dichlorobenzene with p-bromophenol and/or p-chlorophenol.

7. A polyarylene sulfide resin composition, which comprises (A) from 50 to 70 parts by weight of a polyarylene sulfide resin as prepared by copolymerizing an essential monomer of the following formula (III) with a comonomer of the following formula (II) in a ratio of the comonomer to the total comonomer and the essential monomer of falling between 0.5 and 15 mol%, (B) from 30 to 50 parts by weight of glass fibers, and (C) from 0 to 3 parts by weight, relative to 100 parts by weight of the polyarylene sulfide resin (A), of a coupling agent,

(II)

wherein $X^1$ represents a halogen atom, and plural $X^1$'s may be the same or different;

A represents an OH group; and j falls between 1 and 4,

(III)

wherein $X^2$ represents a halogen atom, and plural $X^2$'s may be the same or different;

$R^1$ represents an alkyl group having from 1 and 6 carbon atoms, or an aryl or arylalkyl group having from 6 to 20 carbon atoms, and plural $R^1$'s may be the same or different; and h falls between 0 and 4, and wherein the monomer copolymerization to prepare the polyarylene sulfide resin is carried out in the presence of an alkali metal sulfide as a sulfur source and lithium hydroxide monohydrate.

8. The polyarylene sulfide resin composition of claim 7 wherein the sulfur source is lithium sulfide.

9. The polyarylene sulfide resin composition as claimed in claim 7, which satisfies the condition of the following numerical formula (I)

which specifies that the spiral flow length, x(mm), to give a molding having a thickness of 1 mm and the flexural strength, y (MPa), of the molding satisfy the following numerical formula (I):

$$y \geq -(3x/10)+340 \qquad (I)$$

wherein x falls between 100 and 300.

10. The polyarylene sulfide resin composition as claimed in claim 7 or 9, wherein the polyarylene sulfide resin is a copolymer of p-dichlorobenzene and 2,4-dichlorophenol.

* * * * *

UNITED STATES PATENT AND TRADEMARK OFFICE
CERTIFICATE OF CORRECTION

PATENT NO. : 6,489,437 B2
DATED : December 3, 2002
INVENTOR(S) : Okamoto et al.

It is certified that error appears in the above-identified patent and that said Letters Patent is hereby corrected as shown below:

Title page,
Item [45] and the [*] Notice should read as follows:

-- [45] **Date of Patent: *Dec. 3, 2002**

[*] Notice: This patent issued on a continued prosecution
application filed under 37 CFR 1.53(d), and is
subject to the twenty year patent term provisions
of 35 U.S.C. 154(a)(2).

Subject to any disclaimer, the term of this
patent is extended or adjusted under 35
U.S.C. 154(b) by 0 days. --

Signed and Sealed this

Twentieth Day of May, 2003

JAMES E. ROGAN
*Director of the United States Patent and Trademark Office*